United States Patent [19]

Hohmann et al.

[11] Patent Number: 5,366,259
[45] Date of Patent: Nov. 22, 1994

[54] QUICK CONNECT/DISCONNECT FLUID COUPLING

[75] Inventors: Ralf Hohmann; Ralf Spors, both of Bruchköbel, Germany

[73] Assignee: Rasmussen GmbH, Maintal, Germany

[21] Appl. No.: 2,326

[22] Filed: Jan. 8, 1993

[30] Foreign Application Priority Data

Jan. 10, 1992 [DE] Germany .............................. 4200424
Nov. 28, 1992 [DE] Germany .............................. 4240136

[51] Int. Cl.$^5$ .............................................. F16L 37/08
[52] U.S. Cl. ................................. 285/305; 285/23;
                    285/314; 285/323; 285/308; 285/316
[58] Field of Search ............... 285/322, 323, 324, 314,
                    285/315, 316, 85, 86, 91, 243, 23, 305

[56] References Cited

U.S. PATENT DOCUMENTS

| | | | |
|---|---|---|---|
| 3,314,696 | 4/1967 | Ferguson et al. | 285/276 |
| 3,359,015 | 12/1967 | Zahuranec | 285/316 |
| 4,451,069 | 5/1984 | Melone | 285/86 |
| 4,790,571 | 12/1988 | Montanari et al. | 285/315 |
| 5,029,904 | 7/1991 | Hunt | 285/314 |
| 5,042,848 | 8/1991 | Shiozaki | 285/323 |
| 5,069,489 | 12/1991 | Bartholomew | 285/921 |
| 5,181,751 | 1/1993 | Kitamura | 285/308 |
| 5,226,680 | 7/1993 | Bahner et al. | 285/314 |
| 5,284,369 | 2/1994 | Kitamura | 285/308 |

FOREIGN PATENT DOCUMENTS

| | | |
|---|---|---|
| 3603479C1 | 7/1987 | Germany . |
| 3741250 | 6/1989 | Germany . |
| 5001795 | 1/1993 | Japan .................................. 285/322 |

*Primary Examiner*—Eric K. Nicholson
*Attorney, Agent, or Firm*—Darby & Darby

[57] ABSTRACT

A fluid coupling wherein a tubular coupling member has a first terminal sealingly engageable with an end of a first conduit and a second terminal sealing engageable with an end of a second conduit. The end of the second conduit has a radially outwardly extending retaining flange and the coupling member has a set of radially movable resilient arms which engage the flange when the second terminal is in proper engagement with the end of the second conduit. The arms can be prevented from becoming accidentally disengaged from the flange by one end portion of a sleeve which is reciprocable along and surrounds the coupling member. The sleeve can be releasably locked in a release position in which the arms are free to become disengaged from the flange and/or in a locking position in which the sleeve prevents disengagement of the arms from the flange. The device for locking the sleeve can comprise a clamp which is more or less permanently installed in the sleeve or a clamp which can be completely disengaged from the coupling member and is not connected to the sleeve. A spring can be provided to bias the sleeve to the locking position. The clamp can be omitted if the locking device comprises one or more cams on the coupling member and a follower for each cam; such follower or followers are provided in the sleeve.

18 Claims, 5 Drawing Sheets

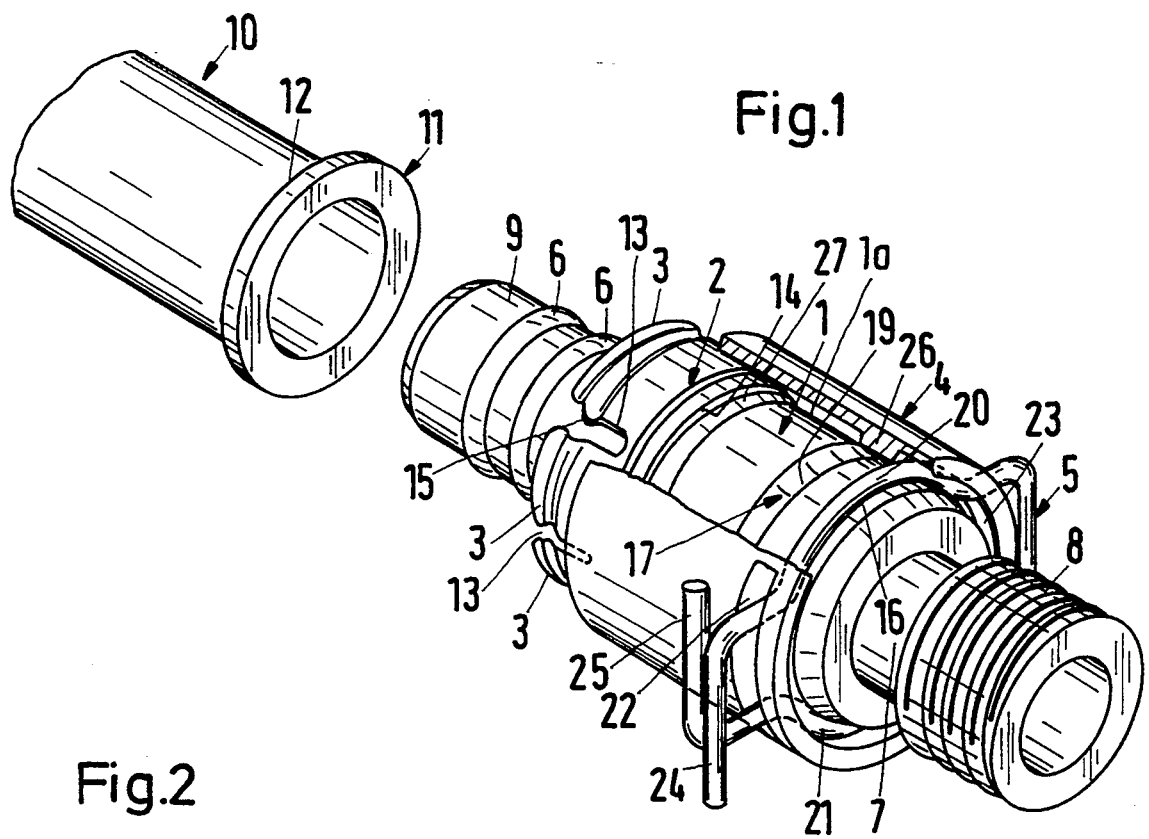
Fig.1
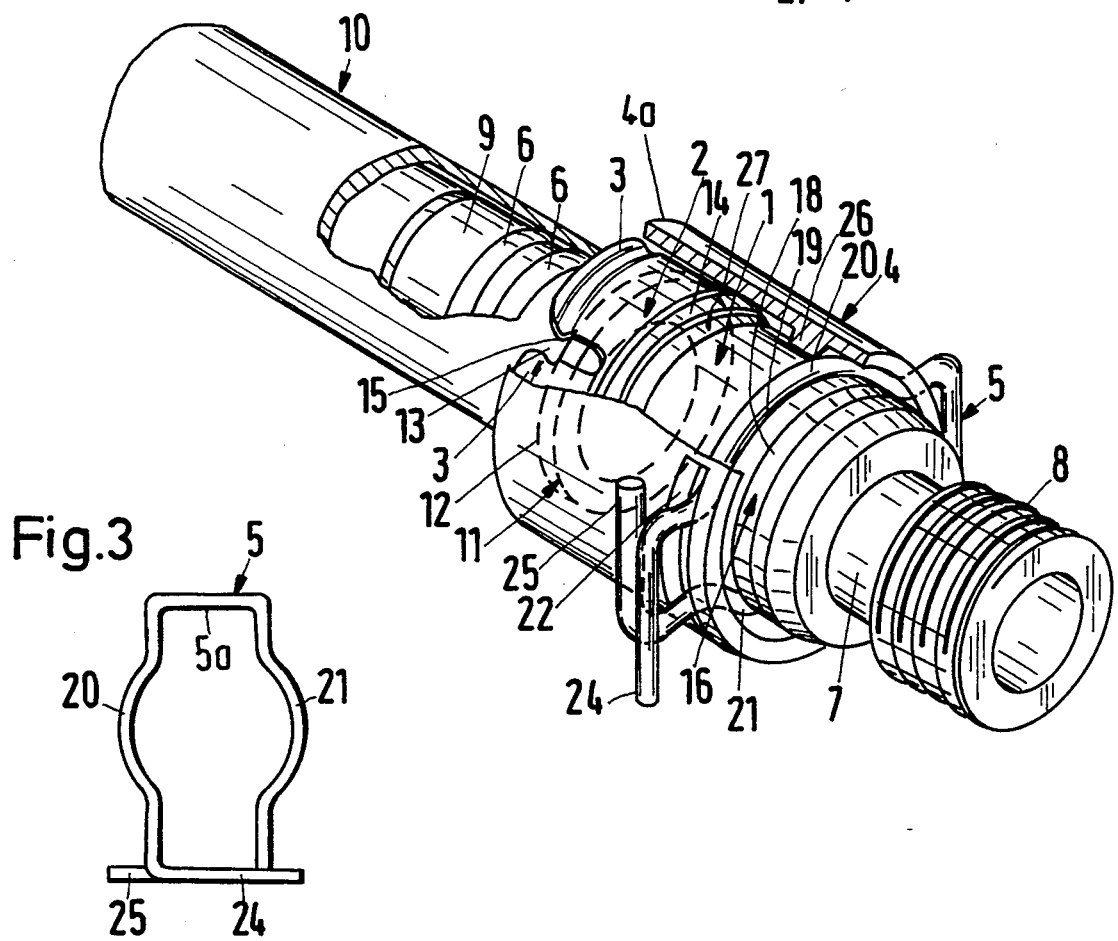
Fig.2
Fig.3

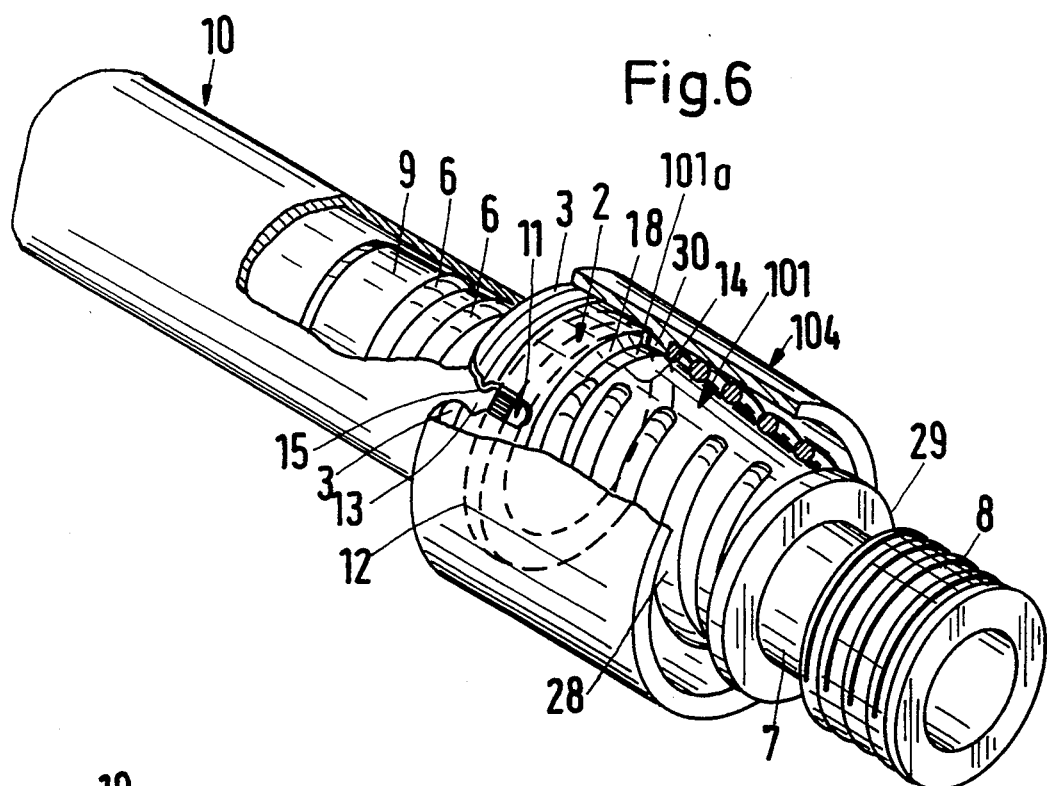
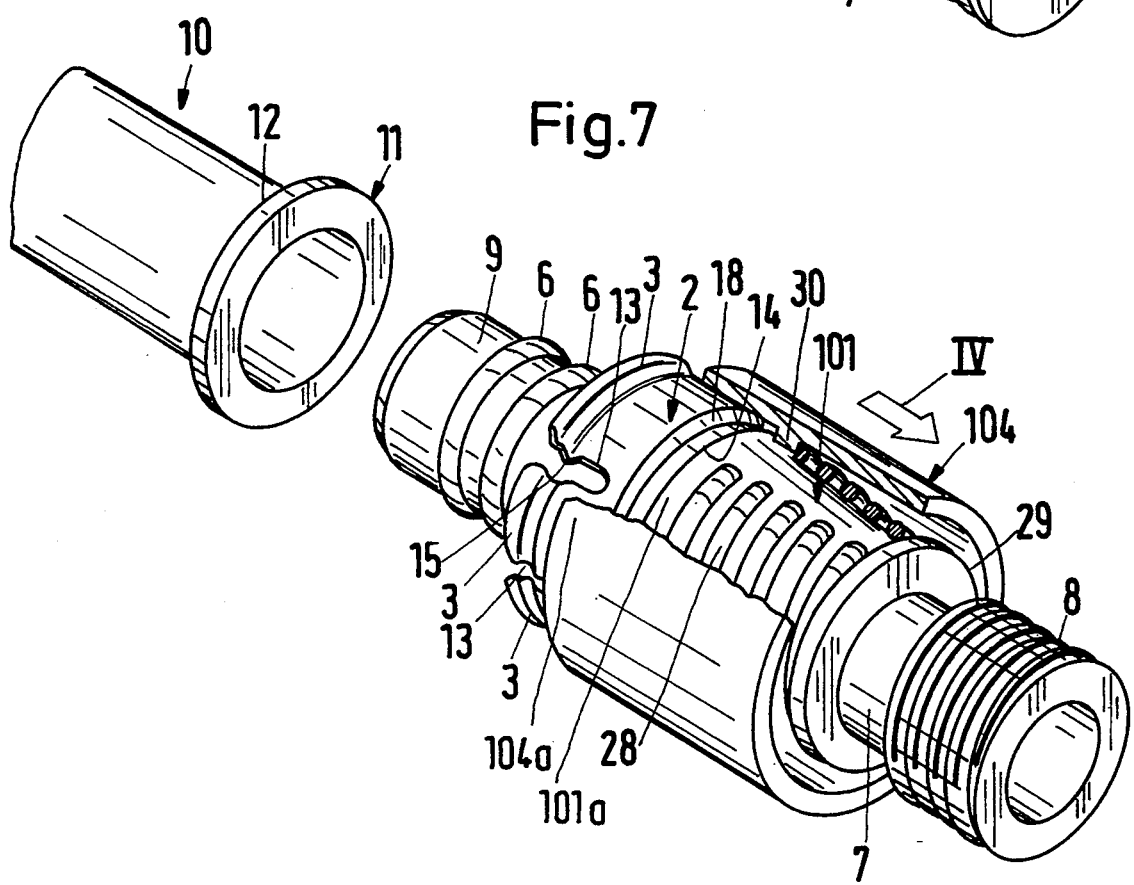

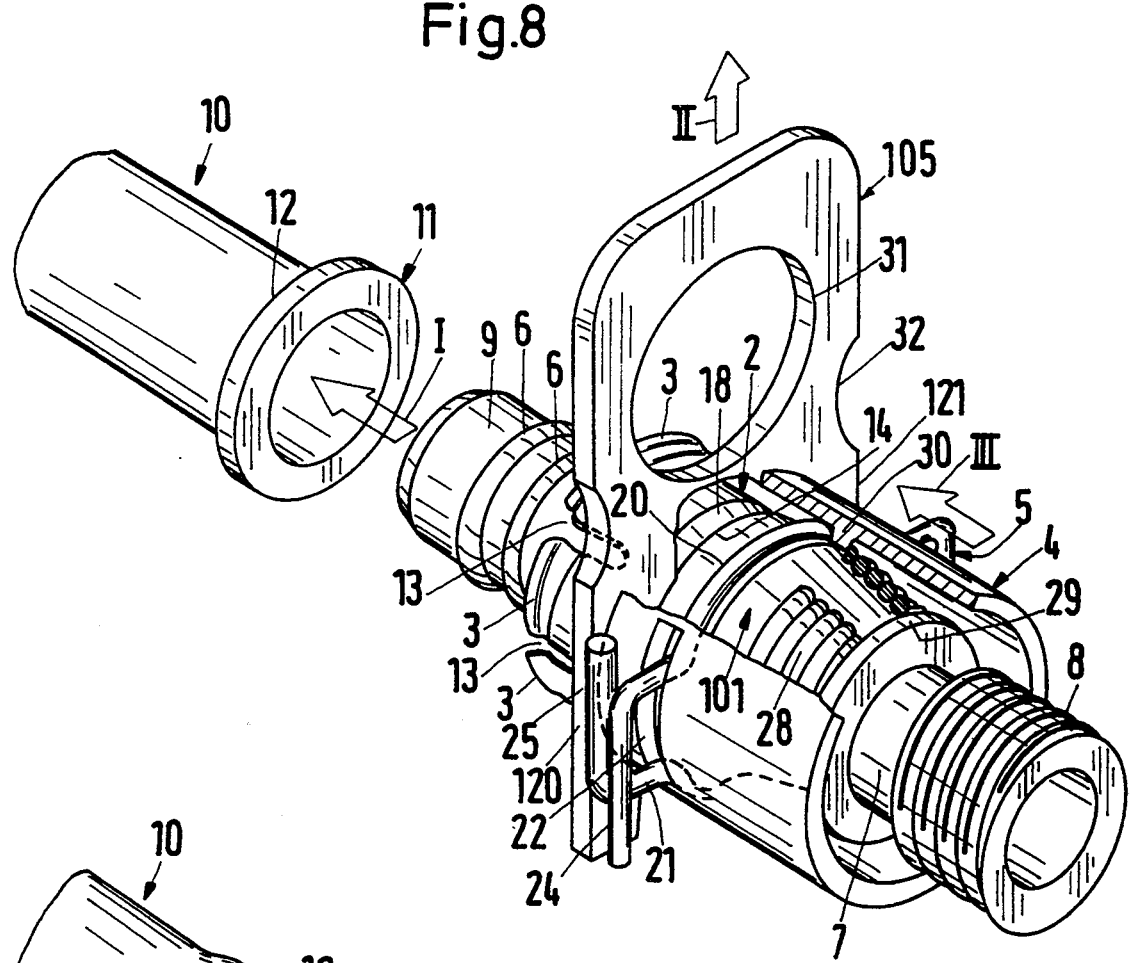

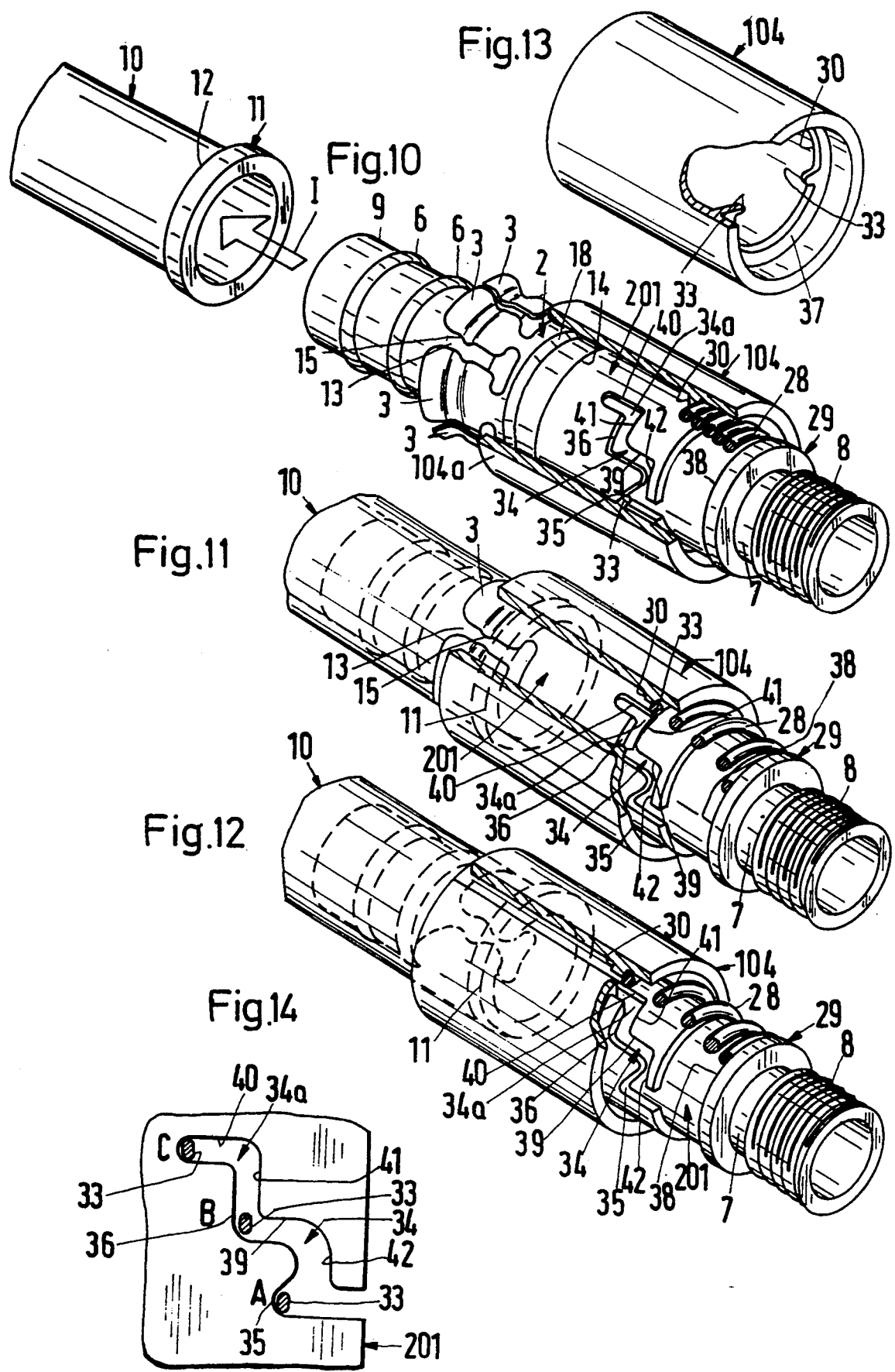

QUICK CONNECT/DISCONNECT FLUID COUPLING

BACKGROUND OF THE INVENTION

The invention relates to improvements in fluid couplings in general, and more particularly to improvements in devices which can be used to rapidly establish or terminate a sealing connection between the ends of two conduits. Still more particularly, the invention relates to improvements in couplings which are designed to establish a readily separably sealing connection between an end of a first conduit (e.g., a hose) and a second conduit (e.g., a pipe or a nipple) having an end with an at least substantially radially extending retaining portion, e.g., with an external flange having a substantially radially outwardly extending retaining surface confronting the other end of the second conduit.

German patent application Serial No. 37 41 250 of Rösch et al. (published Jun. 15, 1989) discloses a coupling which is designed to establish a sealing connection between two conduits, particularly between two conduits which serve to convey fuel in a motor vehicle. The coupling comprises a tubular coupling member a first terminal of which is connectable with an end of one of the conduits and a second terminal of which is connectable with an end of the other conduit. The coupling member carries resilient arms which can engage a retaining portion at the end of the respective conduit, and the coupling further comprises a sleeve which surrounds and is movable axially of the coupling member to and from a locking position in which the arms cannot be disengaged from the retaining portion. One or more sealing elements are interposed between at least one of the terminals and the end of the respective conduit. The external surface of the coupling member is provided with circumferentially extending grooves alternating with ribs, and the internal surface of the sleeve is also provided with alternating ribs and grooves. The sleeve is movable axially of the coupling member to any one of several positions in each of which one or more internal ribs extend into a different set of external grooves, and vice versa. This enables the coupling member to hold the sleeve against unintentional movement all the way to a position in which the coupling member can become disengaged from the retaining portion.

A drawback of the proposal of Rösch et al. is that the sleeve must be made of a material which exhibits a considerable amount of elasticity. Therefore, the assembled coupling cannot stand pronounced stresses, namely axial stresses which suffice to effect radial expansion of the sleeve with attendant expulsion of its internal ribs from the external grooves of the coupling member. Rösch et al. propose to reinforce a portion of the sleeve to prevent such unintentional forcible separation of the coupling member from one of the conduits. Reinforcement of the sleeve contributes to the cost of the coupling. Moreover, a person seeking to assemble the coupling or to separate the coupling member from one of the conduits must exert a considerable force in order to overcome the resistance of mating internal and external ribs.

U.S. Pat. No. 4,451,069 granted May 29, 1984 to Melone discloses a quick disconnect fluid coupling wherein a female member is provided with radially extending latch fingers which are designed to engage a male coupling member. The patentee proposes to employ a locking sleeve which has a set of radially resilient fingers and a ring portion movable to a position in which the fingers of the female coupling member cannot be disengaged from the male coupling member. The patentee further proposes to provide latch means for releasably holding the sleeve in the locking and release positions. The latch means comprises internal ribs on the fingers of the locking sleeve and external grooves in the male member. One of the grooves receives the internal ribs in the locking position of the sleeve, and the other groove receives the internal ribs in the release position of the sleeve. A drawback of the patented coupling is that it must employ complex (and hence expensive) male and female coupling members and a quite complicated sleeve. Moreover, the ability of the coupling to stand axial disengaging stresses is rather limited.

OBJECTS OF THE INVENTION

An object of the invention is to provide a fluid coupling which can be used as a quick connect/disconnect device between flexible and/or rigid conduits and wherein the sleeve can be mass produced from any one of a variety of different materials.

Another object of the invention is to provide a coupling which consists of relatively simple and inexpensive parts.

A further object of the invention is to provide a coupling wherein a relatively small force suffices to move the sleeve between its locking and release positions.

An additional object of the invention is to provide a novel and improved tubular coupling member for use in the above outlined fluid coupling.

Still another object of the invention is to provide the above outlined coupling with novel and improved means for locking the sleeve in at least one of its locking and release positions.

A further object of the invention is to provide a coupling wherein the sleeve can be automatically moved to the locking position after the coupling member is properly engaged with the conduits.

Another object of the invention is to provide a coupling wherein the sleeve can be reliably held either in its locking or in its release position.

An additional object of the invention is to provide a novel and improved method of manipulating the above outlined fluid coupling.

Still another object of the invention is to provide a coupling wherein the sleeve opposes accidental disengagement of the coupling member from a conduit with a substantial force in spite of the fact that the movement of the sleeve to its locking position does not necessitate the exertion of a substantial force.

A further object of the invention is to provide a coupling which can be utilized with advantage under the hood of or elsewhere in a motor vehicle to establish a reliable fluidtight connection between conduits which serve to convey fuel, lubricant or another fluid medium.

Another object of the invention is to provide a coupling which can be used as a superior substitute for heretofore known couplings and which can be manipulated by hand or by resorting to simple and readily available tools.

SUMMARY OF THE INVENTION

One feature of the present invention resides in the provision of a quick connect/disconnect coupling device for releasably connecting an end of a first conduit (e.g., a flexible hose) with a second conduit (e.g., a pipe or a nipple) having an end with a substantially radially extending retaining portion. The improved device comprises an elongated tubular coupling member made of a metallic or plastic material and having a first terminal connectable with the end of the first conduit, a second terminal engageable with the end of the second conduit, and arms (e.g., in the form of resilient prongs) movable substantially radially of the coupling member into and from engagement with the retaining portion at the end of the second conduit upon engagement of the second terminal with the end of the second conduit. The improved device further comprises a sleeve which surrounds and is movable longitudinally of the coupling member between first (locking) and second (release) positions in which the arms are respectively held against disengagement and are free to become disengaged from the retaining portion at the end of the second conduit, and means for releasably locking the coupling member with the sleeve in the second position of the sleeve. The locking means includes a resilient clamp which is carried by the sleeve and has legs movable relative to each other between inoperative positions of disengagement from the coupling member in which the sleeve is free to move from the second to the first position and operative positions of engagement with the coupling member to thus lock the sleeve in the second position.

The retaining portion at the end of the second conduit normally extends substantially radially outwardly of the end of the second conduit; the resilient arms are then movable radially outwardly and thereupon radially inwardly toward engagement with the retaining portion, and radially outwardly for disengagement from the retaining portion. The sleeve includes a portion which prevents radially outward movements of the arms in the first position of the sleeve.

The legs of the clamp are or can be resilient and preferably tend to engage the coupling member to thus hold the sleeve in the second position.

The arrangement is or can be such that the entire clamp is resilient and that the legs of the clamp must be moved away from each other in order to assume the inoperative positions and toward each other in order to assume the operative positions (i.e., to engage the coupling member in the second position of the sleeve).

The peripheral surface of the coupling member can be provided with a recess for reception of at least one leg of the clamp in the second position of the sleeve. The peripheral surface of the coupling member can include an undercut portion which bounds a portion of the recess to prevent unintentional withdrawal or expulsion of the at least one leg from the recess. Still further, the peripheral surface of the coupling member can be provided with a second recess for reception of at least one leg of the clamp in the first position of the sleeve. Such peripheral surface can include a portion which bounds at least a portion of the second recess and is configured to prevent expulsion of the at least one leg from the second recess except in response to the application to the sleeve of a predetermined force acting in a direction to move the sleeve longitudinally of the coupling member from the first position toward the second position. The second recess can be disposed between the arms and the recess for reception of at least one leg in the second position of the sleeve. At least one of the recesses can constitute a circumferentially complete groove in the peripheral surface of the coupling member.

That (e.g., undercut) portion of the peripheral surface of the coupling member which bounds a portion of the first mentioned recess (namely of the recess which receives at least one leg of the clamp in the second position of the sleeve) can be configured to prevent a movement of the legs to their inoperative positions prior to the application to the sleeve of a predetermined force acting in a direction to move the sleeve from the second position. Thus, the sleeve can be released for movement from the second position toward the first position by extracting the at least one leg from the first mentioned recess or by applying to the sleeve a force which suffices to expel the at least one leg from the first mentioned recess.

It is further within the purview of the invention to provide the peripheral surface of the coupling member with a single recess which receives at least one of the legs in the first position of the sleeve, i.e., in that position in which the arms of the coupling member are held against disengagement from the retaining portion at the end of the second conduit. The surface bounding such recess can be configured to permit expulsion of the at least one leg from the recess when the sleeve is acted upon with a given force which is applied in a direction to move the sleeve from the first position toward the second position.

The sleeve is preferably provided with first and second slots for portions of the legs forming part of the aforementioned clamp. The slots can be disposed substantially diametrically opposite each other and extend circumferentially of the sleeve. The legs have free ends which extend from the sleeve through one of the slots, and such one slot has a length which suffices to permit movements of the free ends of the legs relative to each other in order to move the legs to their inoperative positions of disengagement from the coupling member. The free ends of the legs can extend substantially tangentially of the sleeve and can at least partially overlie or overlap each other.

It is also possible to provide the sleeve with a single slot which permits the free ends of the legs to extend from the sleeve and to be engageable by the fingers of a hand or by a suitable tool in order to disengage the legs from the coupling member preparatory to movement of the sleeve from the second position toward the first position. The dimensions (normally the length) of such single slot must be selected with a view to ensure that the free ends of the legs can be moved relative to each other to an extent which suffices to disengage the clamp from the coupling member.

If desired, the coupling member can be provided with an external shoulder for at least one of the legs, and such device can further comprise means for biasing the sleeve toward the first position. The biasing means can comprise a spring which reacts against the coupling member and bears against the sleeve to urge the sleeve against the clamp. The latter is movable into and from engagement with the coupling member substantially radially of the sleeve. Such clamp can include a bifurcated portion with two prongs which constitute the legs of the clamp and engage the shoulder at the exterior of the coupling member in the second position of the sleeve. When the clamp is disengaged from the coupling member, the biasing means dissipates energy and propels the sleeve from the second position toward the first position.

In each embodiment of the improved device, one or more sealing elements in the form of O-rings or the like can be put to use between the second terminal of the coupling member and the end of the second conduit to prevent leakage of a fluid from the second conduit or penetration of a fluid from the surrounding atmosphere into the second conduit.

Another feature of the present invention resides in the provision of a quick connect/disconnect coupling or device for separably connecting one end of a first conduit with a second conduit having an end with a substantially radially extending retaining portion. The improved device comprises an elongated tubular coupling member having a first terminal which is connectable with the end of the first conduit, a second terminal engageable with the end of the second conduit, and arms movable substantially radially of the coupling member into and from engagement with the retaining portion at the end of the second conduit upon engagement of the second terminal with the end of the second conduit. The improved device further comprises a sleeve surrounding the coupling member, rotatable relative to the coupling member and movable longitudinally of the coupling member between first and second positions in which the arms are respectively held against disengagement and are free to become disengaged from the retaining portion at the end of the second conduit. The improved device also comprises means for releasably locking the sleeve in the first and second positions, and such locking means comprises at least one cam provided on the coupling member and at least one follower provided in the sleeve and tracking the at least one cam. The at least one cam includes a first portion which is engaged by the at least one follower in the second position of the sleeve, and a second portion which is engaged by the at least one follower in the first position of the sleeve. The second portion of the at least one cam is offset relative to the first portion in the longitudinal and circumferential directions of the coupling member. The sleeve is movable between the first and second positions through a first distance longitudinally of the coupling member, and the first and second portions of the at least one cam are spaced apart from each other in the longitudinal direction of the coupling member a second distance which matches or at least approximates the first distance.

The just described device preferably further comprises means for biasing the at least one follower against the first portion of the at least one cam in the second position of the sleeve and against the second portion of the at least one cam in the first position of the sleeve. The at least one cam can further comprise a third portion which is offset from the second portion in the longitudinal and circumferential directions of the coupling member. The at least one follower is engageable with the third portion of the at least one cam in response to movement of the sleeve in a direction from the second position and beyond the first position.

The sleeve can comprise two followers which are disposed substantially diametrically opposite each other, and the coupling member then preferably comprises two cams, one for each follower.

The sleeve can be provided with an internal retainer and the coupling member can be provided with an external retainer. The biasing means can comprise a spring (e.g., a coil spring) which reacts against the external retainer and bears against the internal retainer. The latter can include a collar or rib which is or can be of one piece with the major portion of the sleeve, and the at least one follower can extend radially inwardly of the collar; the at least one follower can be of one piece with the collar.

The novel features which are considered as characteristic of the invention are set forth in particular in the appended claims. The improved device itself, however, both as to its construction and the mode of operating the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is an exploded perspective view showing a fluid coupling or quick connect-disconnect device which embodies one form of the invention, the coupling member being disengaged from the conduit having a substantially radially extending retaining portion and a portion of the sleeve being broken away;

FIG. 2 is a perspective view of the coupling which is shown in FIG. 1, portions of the illustrated conduit and of the sleeve being broken away and the sleeve being shown in the first or locking position;

FIG. 3 is a front elevational view of the clamp which is used in the coupling of FIGS. 1 and 2;

FIG. 6 is a perspective view of the coupling of FIG. 4 in assembled condition, with portions of the sleeve and of the illustrated conduit broken away;

FIG. 7 is an exploded perspective view showing the sleeve of the second coupling in an intermediate position between the locking or first position of FIG. 6 and the release or second position of FIG. 4;

FIG. 8 is an exploded perspective view showing a third coupling which constitutes a modification of the coupling of FIGS. 4 and 6–7, one terminal of the tubular coupling member being in the process of entering the end of a conduit and the sleeve being shown in the release position and being partly broken away, the same as a spring which biases the sleeve toward the locking position;

FIG. 9 is a fragmentary perspective view of a portion of a conduit constituting a modification of the conduit shown in FIGS. 1–2, 4 and 6–8;

FIG. 10 is an exploded perspective view showing a fourth coupling, with portions of the sleeve and of the biasing means broken away, one terminal of the coupling member being on its way toward the interior of a conduit whose end is provided with a radially extending retaining portion;

FIG. 11 is a perspective view of the structure of FIG. 10, with the sleeve in the locking position;

FIG. 12 is a perspective view similar to that of FIG. 11 but showing the sleeve in an axial position at a maximum distance from the release position and beyond the locking position;

FIG. 13 is a perspective view of the sleeve in the coupling of FIGS. 10–12, with a portion of the sleeve broken away and showing an internal spring retainer which is of one piece with the sleeve; and FIG. 14 is an enlarged fragmentary developed view of one of the cams provided on the coupling member in the coupling of FIGS. 10–12.

DESCRIPTION OF THE PREFERRED EMBODIMENTS

Figure 4:
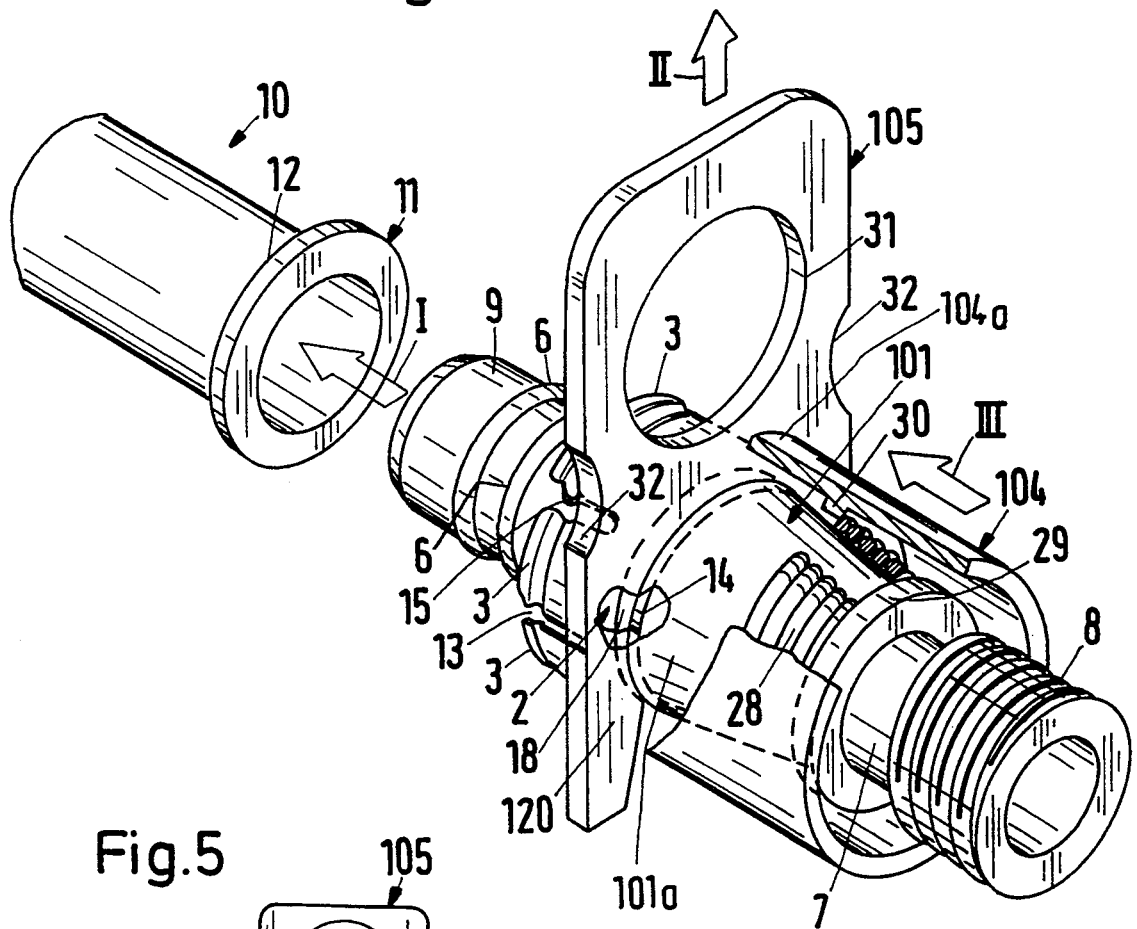
FIG. 4 is an exploded perspective view showing a second coupling which employs a modified clamp and wherein the sleeve, which is partially broken away, is biased to its locking position by a coil spring reacting against the coupling member.
Figure 5:
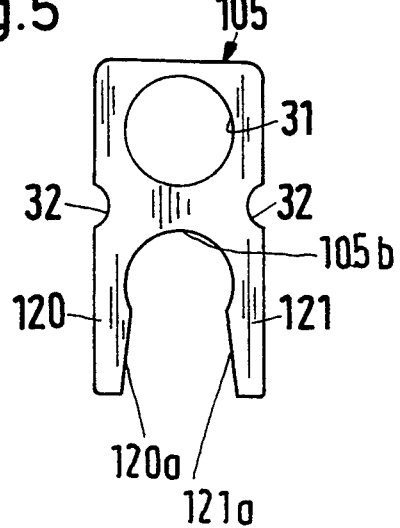
FIG. 5 is a smaller-scale front elevational view of the clamp which is used in the coupling of FIG. 4.

FIGS. 1 and 2 illustrate a quick connect/disconnect device or coupling wherein all of the parts (save for two elastic sealing elements 6 in the form of O-rings) consist of a metallic material. However, it is equally possible to make some or all of the component parts of this coupling from a plastic material. The coupling comprises an elongated tubular coupling member 1, a ring 2 which is form-lockingly connected to and can be said to form part of the coupling member 1 and is provided with an annulus of axially extending radially movable resilient arms or prongs 3, an elongated sleeve 4 which surrounds and is movable longitudinally of the coupling member 1, a device 5 (here shown as a resilient clamp) which serves to releasably lock the sleeve 4 to the coupling member 1 in a release (second) position of the sleeve as shown in FIG. 1, and the aforementioned sealing elements 6.

The coupling member 1 comprises a first end portion or terminal 7 which is separably or more or less permanently connectable with one end of a first conduit (not shown), e.g., with one end of a flexible hose under the hood in a motor vehicle. If the one end of the hose carries an internally threaded nipple or a nut, the terminal 7 can be screwed into such nipple or nut; to this end, the terminal 7 is provided with an external thread 8. Alternatively, the terminal 7 can be forcibly inserted into one end of a nose and such end of the hose is then surrounded and compressed by a customary strap which maintains the internal surface of the hose in sealing engagement with the external surface of the terminal 7.

The other end portion or terminal 9 of the coupling member 1 is provided with circumferentially complete external grooves for portions of the sealing elements 6. The terminal 9 can be inserted into the end 11 of a second conduit 10, e.g., a rigid or substantially rigid pipe, tube or nipple. The sealing elements 6 then prevent the escape of a fluid medium from the passage or path which is defined by the conduit 10 and coupling member 1, or the penetration of atmospheric air into such passage. The conduit 10 can be stationary, e.g., it can be rigid with a gasoline tank, a radiator or another component part of a motor vehicle.

The end 11 of the conduit 10 is provided with a retaining portion 12 in the form of a radially outwardly extending flange. The retaining action for the arms 3 of the ring 2 is actually furnished by that (at least substantially radial) surface or flank of the flange 12 which confronts the other end (not shown) of the conduit 10, i.e., which faces away from the terminal 7 of the coupling member 1. The illustrated flange 12 can be replaced with a rib or bead and can but need not constitute an uninterrupted (circumferentially complete) annulus around the conduit 10. Furthermore, the flange 12 or another suitable retaining portion need not be provided at the very end of the conduit 10 (as actually shown in FIG. 1) but can be at least slightly spaced apart from the illustrated end of the passage within the conduit 10.

The ring 2 is made of resilient metallic sheet material, and its left-hand portion is provided with axially parallel slots 13 which alternate with the resilient arms 3. The right-hand portion of the ring 2 is or can be subjected to a radial compressing stress and is a force fit in an annular recess 14 of the coupling member 1 so that, for all practical purposes, the ring 2 constitutes an integral part of the coupling member. Thus, the arms or prongs 3 cannot move axially of the coupling member 1 toward or away from the terminal 7. The illustrated ring 2 is assumed to be provided with an annulus of six identical or nearly identical and equidistant resilient arms 3. The free end portions of the arms 3 are provided with corrugations so that the internal surface of each arm 3 exhibits a circumferentially and radially inwardly extending protuberance or bead 15. Such protuberances can be obtained as a result of suitable deformation of the respective arms 3, and each of these protuberances must move first radially outwardly to thereupon snap radially inwardly behind the retaining flange 12 when the terminal 9 is properly engaged with the conduit 10, i.e., when the terminal 9 extends into the end 11 of this conduit in a manner as shown in FIG. 2. Each protuberance 15 preferably extends circumferentially of the ring 2 all the way between the respective neighboring slots 13. When the arms 3 are not stressed (deformed), the diameter of the circle defined by the radially innermost portions of the protuberances 15 is at least slightly smaller than the maximum diameter of the retaining flange 12.

The peripheral surface 1a of the coupling member 1 is provided with two recesses 16, 17 in the form of circumferentially complete grooves which are spaced apart from each other in the axial direction of the coupling member. The peripheral surface 1a includes a first undercut portion 18 which bounds a portion of the recess 16, and a second undercut portion 19 which bounds a portion of the recess 17. The undercut portion 18 is located at that side of the recess 16 which is nearer to the recess 17, and the undercut portion 19 is located at that side of the recess 17 which is nearer to the recess 16.

The clamp 5 (which constitutes a means for releasably locking the sleeve 4 to the coupling member 1 in the first or locking position of FIG. 2 as well as in the second or release position of FIG. 1) is preferably made of a resilient metallic material (such as springy wire) and includes two elongated legs 20, 21. The major portions of the legs 20, 21 are disposed diametrically opposite each other with reference to the axis of the coupling member 1, and these legs respectively comprise free ends 24, 25 which are located externally of the sleeve 4 and extend substantially tangentially of the external surface of the sleeve. Furthermore, the free ends 24, 25 overlie or overlap each other in a manner as best shown in FIG. 3. The major portions of the legs 20, 21 tend to move toward each other so that they extend into portions of the recess 16 or into portions of the recess 17, depending on the selected axial position of the sleeve 4 relative to the coupling member 1. As can be seen in FIGS. 1 and 2, the sleeve 4 is provided with two elongated circumferentially extending slots 22, 23 which are disposed diametrically opposite each other. The slot 23 permits passage of the web 5a and of the immediately adjacent portions of the legs 20, 21 outwardly and beyond the external surface of the sleeve 4, and the slot 22 permits passage of the free ends 24, 25 so that these free ends are located externally of the sleeve diametrically opposite the web 5a. The median portions of the legs 20, 21 are curved, and the curvature of these median portions preferably matches the curvature of the bottom surfaces in the recesses 16, 17. The length of the slot 22 is sufficient to permit a movement of the free ends 24, 25 relative to each other in order to expel the arcuate median portions of the legs 20, 21 from the recess 16 or 17, i.e., to disengage the clamp 5 from the coupling member 1 preparatory to axial movement of the sleeve 4 from the release position of FIG. 1 toward the locking position of FIG. 2 or in the opposite direction. The free ends 24, 25 of the legs 20, 21 can be manipulated by hand or by a suitable tool, e.g., by the jaws of pincers, tongs or the like. As already mentioned before, the legs 20, 21 tend to move their free ends 24, 25 toward each other to positions corresponding to the positions shown in FIG. 3; this ensures that the arcuate median portions of the legs 20, 21 automatically enter the recess 16 or 17 when the sleeve 4 is moved axially of the coupling member 1 to the locking position of FIG. 2 or to the release position of FIG. 1. It goes without saying that the inner diameter of the sleeve 4 is selected with a view to permit the just discussed movements of the arcuate median portions of the legs 20, 21 away from each other, i.e., that the internal surface of the sleeve does not interfere with radially outward movements of the arcuate median portions of the legs away from the recess 16 or 17. The internal surface of the sleeve 4 can serve as a means for limiting the extent of movability of arcuate median portions of the legs 20, 21 radially of the coupling member 1 and away from each other.

In order to establish a sealing engagement between the end 11 of the conduit 10 and the terminal 9 of the coupling member 1 (the terminal 7 is assumed to be sealingly connected with one end of the non-illustrated other conduit), the person in charge moves the coupling member 1 to the position of FIG. 1 while the sleeve 4 is maintained in the release or second position in which the median portions of the legs 20, 21 of the clamp 5 extend into the recess 16 in the peripheral surface 1a of the coupling member. This means that the left-hand end portion 4a of the sleeve 4 is spaced apart from the arms 3 of the ring 2 so that the arms 3 are free to move radially and away from the axis of the coupling member 1. This enables the arms 3 to ride over and to thereupon automatically snap behind the flange 12 at the end 11 of the conduit 10 while the terminal 9 advances into and within the conduit 10 toward the properly or fully inserted position of FIG. 2. Insertion of the terminal 9 into the conduit 10 involves at least some deformation of the sealing elements 6 with the resulting establishment of a fluidtight seal between the passage within the parts 1, 10 and the surrounding atmosphere. Insertion of the terminal 9 into the end 11 of the conduit 10 is terminated when the protuberances 15 at the inner sides of the arms 3 snap behind the retaining flange 12.

The next step involves axial movement of the sleeve 4 from the release or second position of FIG. 1 to the locking or first position of FIG. 2. To this end, the operator uses her or his fingers or a tool to move the free ends 24, 25 of the legs 20, 21 relative to each other in order to expel the arcuate median portions of the legs from the recess 16, i.e., radially outwardly beyond the undercut portion 18 of the peripheral surface 1a. The sleeve 4 is then free to move axially toward the locking position of FIG. 2 in response to the exertion of a relatively small effort, namely an effort primarily due to frictional engagement of the median portions of the legs 20, 21 with the peripheral surface 1a between the recesses 16, 17 unless the operator continues to apply to the free ends 24, 25 a requisite force so that the median portions of the legs 20, 21 do not contact the peripheral surface 1a at all.

Alternatively, the operator need not engage the free ends 24, 25; instead, the operator applies against the sleeve 4 a force to move the sleeve toward the conduit 10, i.e., away from the terminal 7 of the coupling member 1. The magnitude of such force depends primarily, or to a large extent, on the configuration of the undercut portion 18 of the peripheral surface 1a, i.e., on the resistance which the undercut portion 18 offers to axial movement of the sleeve 4 toward the locking position of FIG. 2 without any spreading of the arcuate median portions of the legs 20, 21 by the free ends 24, 25.

The axial movement of the sleeve 4 to the locking position of FIG. 2 is terminated in automatic response to snapping of arcuate median portions of the legs 20, 21 into the recess 17 of the peripheral surface 1a. The circumferentially complete end portion 4a of the sleeve 4 then at least partially surrounds the arms 3 of the ring 2 to thus prevent unintentional disengagement of these arms from the retaining flange 12 at the end 11 of the conduit 10. If the conduit 10 is thereupon pulled axially and away from the terminal 7 of the coupling member 1 and/or if the coupling member is pulled in a direction to extract the terminal 9 from the end 11 of the conduit 10, the sealing connection between the parts 1 and 10 can be terminated only if the pull is sufficient to overcome the resistance of the median portions of the legs 20, 21 against movement radially outwardly over and beyond the undercut portion 19 of the peripheral surface 1a so that the sleeve is free to move back toward the release or second position of FIG. 1. The configuration of the undercut portion 19 of the peripheral surface 1a of the coupling member 1 can be readily selected in such a way that, for all practical purposes, the sleeve 4 can leave the locking position of FIG. 2 only in response to manipulation of the free ends 24, 25 in directions to expel the arcuate median portions of the legs 20, 21 from the recess 17.

The recess 17 can be, and normally is, deeper than the recess 16. Moreover, the configuration of the undercut portion 19 can be such that the only possible way of returning the sleeve 4 to the release position of FIG. 1 is to spread the median portions of the legs 20, 21 apart by exerting a requisite force against the free ends 24, 25. Alternatively, the force which is required to move the sleeve 4 from the position of FIG. 2 back to the position of FIG. 1 solely as a result of the application of an axial stress upon the sleeve is much larger than any force which is anticipated when the improved coupling is in actual use, e.g., in a motor vehicle. For example, the free ends 24, 25 of the legs 20, 21 can be acted upon by the thumb and index finger of one hand in directions substantially tangentially of the peripheral surface of the coupling member in order to expel the arcuate median portions of these legs radially outwardly of the coupling member 1 and beyond the undercut portion 19 in the recess 17.

The median portions of the legs 20, 21 automatically snap into the recess 16 when the sleeve 4 is returned to the release position of FIG. 1. The end portion 4a of the sleeve 4 is then spaced apart from the arms 3 so that these arms can expand in response to a pull upon the coupling member 1 in a direction to extract the terminal 9 from the end 11 of the conduit 10. This entails radially outward movements of the arms 3 so that their protuberances 15 can ride over the retaining flange 12 before the arms 3 again move radially inwardly toward the positions of FIG. 1.

The improved coupling can be further provided with means for preventing any movements (or any appreciable movements) of the sleeve 4 in a direction away from the terminal 9 and beyond the release position of FIG. 1. Alternatively or additionally, the coupling can be provided with means for preventing any movements (or any appreciable movements) of the sleeve 4 in a direction away from the terminal 7 and beyond the locking position of FIG. 2. To this end, the sleeve 4 is provided with a stop in the form of a circumferentially complete ring-shaped internal collar 26 and the coupling member 1 is provided with a stop in the form of a circumferentially complete external shoulder 27 which is engaged by the collar 26 when the sleeve 4 reaches the locking position of FIG. 2. The collar 26 can be replaced with a single projection if the other stop 27 is a circumferentially complete shoulder and vice versa. The illustrated stop 26 or its equivalent can be omitted if the coupling member 1 is provided with the external shoulder 27 or with an equivalent of such stop. All that is necessary is to select the position and the dimensions of the shoulder 27 or of its equivalent in such a way that this stop can be engaged by the legs 20, 21 of the clamp 5, either at the time the legs 20, 21 enter the recess 17 or immediately or shortly after these legs advance beyond the recess 17 in a direction away from the recess 16.

An important advantage of the improved coupling is that the relatively simple and inexpensive clamp 5 can reliably maintain the sleeve 4 in the release position of FIG. 1 with a selected force. Moreover, the sleeve 4 can be moved between the positions of FIGS. 1 and 2 in response to the exertion of a small force. All that is necessary is to provide the sleeve 4 with means (such as the slot 22 or the slots 22, 23) for reliably connecting it with the clamp 5 so that the latter is compelled to share the axial movements of the sleeve relative to the coupling member 1. Thus, the clamp 5 renders it possible to simplify the sleeve 4; it is merely necessary to ensure that the sleeve exhibits the required strength to resist deformation which would be necessary to move it from the locking position or from the release position without any, or in response to minimal, deformation of the clamp 5. A simple length of metallic tubular stock can be used to make the illustrated sleeve 4, especially if the internal stop 26 is omitted. It is also possible to affix the web 5a to the internal surface of the sleeve 4 so that the slot 23 can be dispensed with.

Another important advantage of the improved coupling is that the sleeve 4 can be properly located in the release position (by causing the legs 20, 21 of the clamp 5 to enter the recess 16) before the terminal 9 of the coupling member 1 is introduced into or is otherwise sealingly engaged with the conduit 10. This ensures that the portion 4a of the sleeve 4 cannot interfere with those radial movements of the arms 3 which are necessary to ensure that the ring 2 (and hence the coupling member 1) is properly connected with the conduit 10. In other words, the retaining action of the clamp 5 and of the undercut portion 19 of the peripheral surface 1a of the coupling member 1 can be readily selected in such a way that accidental or unintentional axial movement of the sleeve from the release position toward the locking position is highly unlikely or plain impossible. Moreover, the resilient clamp 5 can cooperate with the sleeve 1 to furnish audible indications when the median portions of the legs 20, 21 snap into the recess 16 or 17 of the peripheral surface 1a.

The recess 17 and the undercut portion 19 in this recess exhibit the advantage that the magnitude of the force which is required to unintentionally shift the sleeve 4 from the locking position of FIG. 2 can be selected with a view to practically exclude such axial movement of the sleeve until and unless an operator decides to separate the terminal 9 from the conduit 10 by permitting the arms 3 to expand radially outwardly in response to the exertion of a relatively small pull upon the coupling member in a direction away from the conduit 10, i.e., in response to intentional expansion of the clamp 5 so that its legs 20, 21 are moved radially outwardly beyond the undercut portion 19. As mentioned above, the magnitude of the force which is required to expel the legs 20, 21 from the recess 16 without any manipulation of the free ends 24, 25 can be a small fraction of the force which is required to expel the legs 20, 21 from the recess 17 without intentional spreading of the clamp 5 in response to the application of forces to the free ends 24 and 25.

Though the clamp 5 can be connected with the sleeve 4 in many different ways (for the purpose of ensuring that the clamp shares the axial movements of the sleeve relative to the coupling member 1), the illustrated form-locking connection by way of the circumferentially extending slots 22, 23 (or at least by resorting to a single slot 22) is preferred at this time because it is simple and the slot 22 can be readily configurated and dimensioned for the purpose of permitting adequate spreading of the clamp 5 preparatory to movement of the sleeve 4 from the locking position of FIG. 2 toward the release position of FIG. 1 or in the opposite direction. The surfaces bounding the slots 22, 23 ensure that the clamp 5 is compelled to share all axial movements of the sleeve 4 relative to the coupling member 1, i.e., in a direction from the terminal 7 toward the terminal 9 or in the opposite direction.

The free ends 24, 25 of the legs 20, 21 can be provided with handles or with other means for facilitating the spreading of the clamp 5. However, it normally suffices to configurate the free ends 24, 25 in a manner as shown in FIGS. 1 to 3, i.e., so that the free ends extend substantially tangentially of the external surface of the sleeve 4 and are parallel or nearly parallel to and overlie or overlap each other. This renders it possible to manipulate the free ends 24, 25 with two fingers of one hand in order to expel the arcuate median portions of the legs 20, 21 from the recess 16 or 17.

FIGS. 4 to 7 illustrate a second coupling wherein the clamp 5 is replaced with a clamp 105 which is separable from the coupling member 101 and is not connected with the sleeve 104. All such parts of the second coupling which are clearly identical or practically identical with the corresponding parts of the coupling of FIGS. 1 to 3 are denoted by similar reference characters, and all parts which are similar to the corresponding parts of the first coupling are denoted by similar reference characters plus 100.

When the sleeve 104 is retracted to the release or second position of FIG. 4, the clamp 105 can be inserted radially of the sleeve and coupling member 101 to engage a shoulder 18 at the adjacent end of the ring 2 which extends into the recess 14 at the respective end of the median portion of the coupling member 101. The clamp 105 then cooperates with a biasing means in the form of a coil spring 28 to maintain the sleeve 104 in the release position in which the portion 104a of the sleeve cannot interfere with radially outward movements of the arms 3. The spring 28 reacts against a flange-like external retainer 29 of the coupling member 101 and bears against an internal retainer or shoulder 30 of the sleeve 104 in a direction to urge the sleeve toward the locking or first position of FIG. 6, i.e., to bias the left-hand end face of the sleeve against the properly inserted clamp 105. At such time, the clamp 105 rides on the coupling member 101 with its resilient legs 120 and 121 which constitute the prongs or tines of a bifurcated portion of the clamp (see particularly FIG. 5).

The illustrated coil spring 28 is a conical coil spring which surrounds a frustoconical portion of the external or peripheral surface 101a of the coupling member 101. The smaller-diameter end of the frustoconical portion of the peripheral surface 101a extends or can extend all the way to the flange-like retainer 29. The retainer 30 can constitute a circumferentially complete internal collar of the sleeve 104.

The member 101 of the coupling of FIGS. 4 to 7 need not be provided with recesses 16, 17 and/or with the undercut portions 18, 19 because the legs 120, 121 of the clamp 105 merely straddle a cylindrical portion of the peripheral surface 101a when the clamp 105 is held in the operative position of FIG. 4 to prevent the sleeve 104 from leaving its release position of FIG. 4 in a direction toward the locking position of FIG. 6.

The clamp 5 of FIGS. 1 to 3 is preferably made of spring steel or a like metallic material. The clamp 105 of the coupling which is shown in FIGS. 4, 6 and 7 is or can be made of springy sheet steel stock or of relatively hard but still flexible resilient plastic material. Such clamp 105 can be made of a flat piece of metallic or plastic material, and the resiliency of its legs 120, 121 (in directions to move their free ends toward or away from each other) can be enhanced by the provision of notches 32 in the edge faces between the legs and the annular second portion of the clamp 105. The opening 31 in the annular portion of the clamp 105 can permit the insertion of a finger (e.g., an index finger) which is used to move the clamp 105 radially of the sleeve 104 and coupling member 101 toward or away from the operative position of FIG. 4.

The arcuate internal edge face 105b in the cutout between the legs 120, 121 extends along an arc of at least slightly more than 180° and the radius of curvature of this edge face (in undeformed condition of the clamp 105) matches or approximates the radius of the peripheral surface 101a adjacent the shoulder 18; this ensures that the legs 120, 121 must undergo at least some deformation at the respective notches 32 in order to ensure that the edge face 105b will move into contact with the adjacent portion of the peripheral surface 101a. The inner sides 120a, 121a of the legs 120, 121 converge slightly toward each other and toward the edge face 105b and thus serve as ramps to facilitate the advancement of the clamp 105 radially of the coupling member 101 toward the operative position of FIG. 4. The legs 120, 121 are subjected, primarily or exclusively, to bending or flexing stresses in the plane of the clamp 105. Such bending or flexing of the legs 120, 121 is facilitated by the provision of the notches 32.

If the terminal 9 of the coupling member 101 is to be introduced into the end 11 of the conduit 10, the sleeve 104 should be securely held in the release or second position of FIG. 4. This is achieved by pushing the sleeve 104 axially of and along the coupling member 101 in a direction to move the retainer 30 toward the retainer 29 and to thus cause the coil spring 28 to store energy. The next step involves the application of the clamp 105, i.e., the legs 120, 121 are caused to straddle the peripheral surface 101a adjacent the shoulder 18 whereby the ramps 120a, 121a slide along the peripheral surface 101a and the legs move apart until the adjacent portion of the member 101 snaps into that portion of the cutout between the legs 120, 121 which is surrounded by the edge face 105b. The spring 28 then urges the left-hand end face of the sleeve 104 against the properly applied clamp 105 and the latter is caused to bear against the shoulder 18; this ensures that the arms 3 are free to move radially of the coupling member 101, i.e., the portion 104a of the sleeve cannot interfere with introduction of the terminal 9 into the end 11 of the conduit 10 and/or with proper engagement of the protuberances 15 with the surface at the rear side of the retaining flange 12. The arrow I indicates the direction of introduction of the terminal 9 into the end 11 of the conduit 10. Such introduction is completed when the protuberances 15 snap behind the flange 12. The operator then removes the clamp 105 by moving it in the direction of arrow II whereby the legs 120, 121 again undergo a certain amount of deformation in order to disengage them from the peripheral surface 101a of the coupling member 101. The spring 28 is free to dissipate energy as soon as the clamp 105 is detached from the coupling member 101 whereby the sleeve 104 is propelled toward the locking or first position which is shown in FIG. 6. The direction of such axial movement of the sleeve 104 is indicated by the arrow III (FIG. 4). The sleeve 104 is automatically arrested when it reaches the locking position of FIG. 6, for example, because the retainer 30 for the spring 28 then engages the shoulder 18 at the peripheral surface of the coupling member 101.

The manner of returning the sleeve 104 to the release position of FIG. 4 is shown in FIG. 7. The sleeve 104 can be grasped by hand and pushed relative to the coupling member 101 in the direction of arrow IV. Thus, the sleeve 104 is moved away from the shoulder 18 and its retainer 30 stresses the spring 28 because it moves toward the retainer 29 of the coupling member. By pushing the sleeve 104 in the direction of arrow IV, the operator automatically pulls (or can automatically pull) the coupling member 101 in the same direction so that the terminal 9 is extracted from the end 11 of the conduit 10 as soon as the arms 3 are free to expand in response to movement of the end portion 104a of the sleeve away from the ring 2. The clamp 105 is thereupon reapplied to engage the peripheral surface 101a adjacent the shoulder 18 and the spring 28 is prevented from dissipating the stored energy until and unless an operator decides to reinsert the terminal 9 into the conduit 10 or into another conduit so that the clamp 105 can be disengaged from the member 101. This permits the spring 28 to expand and to propel the sleeve 104 to the locking position of FIG. 6.

An advantage of the coupling of FIGS. 4, 6 and 7 is that the recesses 16, 17 and the undercut portions 18, 19 can be omitted as well as that the sleeve 104 is automatically propelled to the locking position of FIG. 6 as soon as the clamp 105 is detached from the coupling member 101. Furthermore, the sleeve 104 is relatively simple and rather strong because it need not be provided with slots corresponding to the slots 22, 23 of the sleeve 4.

The coupling of FIG. 8 constitutes a modification of the second coupling which is shown in FIGS. 4, 6 and 7. The main difference is that the sleeve 104 of the second coupling is replaced with a sleeve 4 of the type used in the first coupling of FIGS. 1 and 2. The sleeve 4 of FIG. 8 differs from the sleeve 104 in that its left-hand end portion is provided with the slots 22, 23 (the slot 23 cannot be seen) for the clamp 5, and such clamp is used in addition to the clamp 105 (or the clamp 105 is used in addition to the clamp 5). The clamp 105 can secure the sleeve 4 of FIG. 8 in the release or second position in the same way as described with reference to the second coupling of FIGS. 4, 6 and 7, and the clamp 5 of FIG. 8 serves to secure the sleeve 4 in the locking or first position.

Prior to connecting the terminal 9 of the coupling member 101 with the end 11 of the conduit 10, the sleeve 4 must be moved to the position of FIG. 8 in which the spring 28 stores energy between the retainers 29, 30 and the clamp 105 abuts the shoulder 18 to prevent axial expansion of the spring 28 and propulsion of the sleeve 4 toward the terminal 9. The terminal 9 is then inserted into the end 11 of the conduit 10 in the direction of arrow I. The clamp 105 is disengaged from the coupling member 101 (arrow II in FIG. 8) when the protuberances of the arms 3 snap behind the retaining flange 12 and the spring 28 then expands to propel the sleeve 4 to its locking position (arrow III in FIG. 8), i.e., the sleeve then prevents the arms 3 from moving radially outwardly and from becoming disengaged from the flange 12.

The median portions of the legs 20, 21 of the clamp 5 snap into the recess 14 when the sleeve 4 reaches the locking position so that the sleeve cannot be moved back toward the release position of FIG. 8 except by expelling the median portions of the legs 20, 21 from the recess 14. The sleeve 4 can move back toward the position of FIG. 8 (i.e., counter to the direction which is indicated by the arrow III) in response to the application of a predetermined axial force which suffices to expel the median portions of the arms 20, 21 from the recess 14 or in response to manipulation of the free ends 24, 25 in a manner as described with reference to the first coupling of FIGS. 1 and 2, i.e., in response to intentional expulsion of the legs 20, 21 from the recess 14 before the sleeve 4 is pushed against the resistance of the spring 28 to move back toward the release position of FIG. 8.

The terminal 9 can be extracted from the end 11 of the conduit 10 in automatic response to the application of a pull or push to the sleeve 4 in a direction to move it against the resistance of the spring 28. Thus, the terminal 9 leaves the end 11 as soon as the sleeve 4 is retracted sufficiently to permit radially outward movements of the arms 3 so that these arms can ride over the retaining flange 12 as the coupling member 101 is being pulled away from the conduit 10, i.e., counter to the direction indicated by the arrow I.

The clamp 105 is reapplied to the coupling member 101 adjacent the shoulder 18 when the sleeve 4 is returned to the axial position of FIG. 8. It will be seen that the clamp 105 can secure the sleeve 4 in the release position of FIG. 8, and that the clamp 5 can be used to secure the sleeve 4 in the locking position.

FIG. 9 shows a portion of a modified conduit 10 with an end 11 which is enlarged so that the inner diameter of a terminal 9 which is to be inserted into the end 11 matches the inner diameter of the major portion of the conduit 10. This ensures that no turbulence develops when a fluid flows from the conduit 10 of FIG. 9 into a coupling member 1 or 101, or in the opposite direction. In other words, the flow resistance in every part of a passage which is defined by the conduit 10 of FIG. 9 with a coupling member 1 or 101 is at least substantially constant. The conduit 10 of FIG. 9 can be used in lieu of the conduit which is shown in FIGS. 1–2, in lieu of the conduit which is shown in FIGS. 4 and 6–7, in lieu of the conduit shown in FIG. 8 or in lieu of the conduit shown in FIGS. 10–12.

Referring to FIG. 10, there is shown a fourth coupling which does not employ one or more clamps as a means for releasably holding the sleeve 104 in the locking position or in the release position. Instead, the locking means for the sleeve 104 comprises two internal followers 33 which are provided in the sleeve and two cams 34 which are provided on the coupling member 201. The followers 33 are projections (see particularly FIG. 13) which extend substantially radially inwardly of the sleeve 104 and are disposed diametrically opposite each other. The cams 34 are groove cams and are provided in the peripheral surface of the coupling member 201. Each of the two followers 33 tracks a discrete cam 34. The followers 33 extend radially inwardly from and are or can be of one piece with the retainer 30. The latter includes a collar or rib 37 which is of one piece with the sleeve 104 and from which the followers 33 extend substantially radially inwardly toward the axis of the sleeve.

The manner in which one of the followers 33 tracks the respective cam 34 is the same as that in which the other follower 33 tracks the adjacent cam 34. Therefore, each of FIGS. 10, 11, 12 and 14 merely shows one of the cams 34 and the respective follower 33. Furthermore, the following description will deal with the configuration of one of the cams 34 and with the manner in which such one cam cooperates with the corresponding follower 33; the construction of the other cam 34 and the manner in which the other cam cooperates with the adjacent follower 33 are the same. For the sake of clarity, FIG. 14 shows the follower 33 in three different positions A, B and C.

The follower 33 extends into a first portion 35 of the cam 34 when the sleeve 104 is maintained in the second or release position of FIG. 10. The configuration of the surface bounding the groove in the first portion 35 of the cam 34 is such (see particularly FIG. 14) that the follower 33 cannot leave the corresponding position A (the release position of the sleeve 104) until and unless the sleeve is first turned about and thereupon moved longitudinally (axially) of the coupling member 201 in order to advance (e.g., under the bias of the spring 28) into the second portion 36 of the cam 34 to assume the position B (corresponding to the locking or first position of the sleeve). The distance between the portions 35, 36 of the cam 34 (as seen in the axial direction of the coupling member 201) matches or at least closely approximates the distance of the release position of the sleeve 104 from the locking position. FIG. 10 shows the follower 33 in the position A, FIG. 11 shows the follower 33 in the position B, and FIG. 12 shows the follower 33 in a position C in which the follower is in engagement with a third portion 34a of the cam 34, namely with a portion including two mutually inclined slots 40, 41 one of which extends axially and the other of which extends circumferentially of the coupling member 201. Thus, in order to move the follower 33 to the position C of FIG. 12 or 14, it is again necessary to turn the sleeve 104 circumferentially and to thereupon move the sleeve axially of the coupling member 201. The follower 33 can reach the position C by causing the sleeve 104 to move beyond the locking position of FIG. 11 in a direction further away from the release position of FIG. 10 (as viewed in the axial direction of the coupling member 201).

The coil spring 28 in the coupling of FIGS. 10–12 reacts against an annular surface 38 of the retainer 29 of the coupling member 201 and bears against the surface 37 of the aforementioned retainer 30 in the sleeve 104. This spring is installed in stressed condition so that it urges the follower 33 against the cam portion 35 in the release position of the sleeve 104 as shown in FIG. 10, against the cam portion 36 in the locking position of the sleeve as shown in FIG. 11 and against the cam portion 34a in the third position of the sleeve as shown in FIG. 12.

The sleeve 104 is moved (e.g., by hand) to the release position of FIG. 10 before the terminal 9 of the coupling member 201 is inserted into the end 11 of the conduit 10 in the direction of arrow I. The portion 104a of the sleeve 104 is then spaced apart from the arms 3 so that these arms can move radially outwardly and thereupon radially inwardly while riding over the retaining portion 12 at the end 11 of the conduit 10. As mentioned above, the spring 28 biases the follower 33 against the portion 35 of the cam 34 when the follower 33 reaches the position A of FIG. 14 (corresponding to the release position of the sleeve 104) so that the sleeve is unlikely to accidentally leave the release position. The sealing elements 6 undergo deformation in response to insertion of the terminal 9 into the end 11 so that they establish a reliable seal between the external surface of the terminal 9 and the internal surface of the end 11. Insertion of the terminal 9 into the end 11 of the conduit 10 is completed when the protuberances 15 of the arms 3 engage the rear side of the retaining flange 12.

In order to move the sleeve 104 to the locking position of FIG. 11, it is necessary to move the sleeve counter to the direction of arrow I (i.e., in a direction to stress the spring 28) and to simultaneously turn the sleeve in a clockwise direction (looking in the direction of arrow I) about the coupling member 201. Such composite movement of the sleeve 104 relative to the coupling member 201 is controlled by the configuration of the respective part of the cam 34 and is terminated when the follower 33 ends its movement in the portions 42, 39 of the cam 34 and reaches the position B to be urged (by the spring 28) against the cam portion 36. The spring 28 causes the follower 33 to advance in the portion 39 of the cam groove (i.e., in the direction of arrow I) and to bear against the cam portion 36 when the follower reaches the position B corresponding to the locking position of the sleeve 104. The portion 104a of the sleeve 104 then prevents the arms 3 from moving radially outwardly (see FIG. 11) so that the protuberances 15 cannot become disengaged from the retaining flange 12 and the terminal 9 remains in sealing engagement with the end 11 of the conduit 10.

The operator of the coupling of FIGS. 10–12 has the option of thereupon moving the follower 33 to the position C (FIG. 12) by turning the sleeve in a clockwise direction (the follower then moves in the slot 41 of the cam 34) whereupon the spring 28 takes over to move the sleeve in the direction of arrow I; the follower 33 then advances in the slot 40 of the cam and ultimately reaches the position C corresponding to the third position of the sleeve 104 as shown in FIG. 12.

If the coupling member 201 is to be disengaged from the end 11 of the conduit 10, the aforedescribed sequence of steps is carried out in reverse, i.e., the follower 33 is moved from the position C to the position B and thereupon from the position B to the position A which returns the sleeve 104 to the release position of FIG. 10. A relatively small force (counter to the direction indicated by the arrow I) upon the coupling member 201 then suffices to extract the terminal 9 from the conduit 10.

The provision of a cam 34 having the third portion 34a (which enables the sleeve 104 to move beyond the locking position of FIG. 11 and all the way to the third position of FIG. 12) constitutes an optional but desirable feature of the improved coupling. The third portion 34a constitutes an additional safety feature which further reduces the likelihood of accidental or intentional movement of the sleeve 104 to the release position of FIG. 10. For example, it is possible that the sleeve 104 becomes subjected to the action of an abruptly applied force in a direction counter to that which is indicated by the arrow I. If such force is applied at a time when the follower 33 assumes the position C of FIG. 14, the sleeve 104 moves axially of the coupling member 201 until the follower engages the surface bounding the portion 41 of the groove in the cam 34. When the application of the just discussed force is terminated, the spring 28 automatically returns the follower 33 into engagement with the third portion 34a of the cam 34. This will be appreciated by bearing in mind that, in order to move the follower 33 from the position C to the position B, it is necessary to move the sleeve 104 axially (counter to the direction indicated by the arrow I) as well as to turn the sleeve in a counterclockwise direction. Accidental axial shifting of the sleeve 104 counter to the direction of arrow I simultaneously with accidental turning of the sleeve 104 in a counterclockwise direction is highly unlikely and, therefore, the likelihood of such composite movement of the sleeve axially and circumferentially of the coupling member 201 can be discounted. It is even more unlikely that the forces acting upon the sleeve 104 would cooperate in such a way that the sleeve would unintentionally reassume the release position of FIG. 10 (corresponding to the position A of the follower 33), i.e., that the sleeve would permit unintentional disengagement of the terminal 9 from the end 11 of the conduit 10 by performing all such movements which are necessary to move the follower 33 from the position C, through the position B and all the way to the position A of FIG. 14.

An important advantage of the coupling which is shown in FIGS. 10–12 is that the sleeve 104 is even less likely to be accidentally moved from the locking position of FIG. 11 (or from the third position of FIG. 12) back to the release position of FIG. 10. This is due to the fact that any movement of the sleeve 104 from the position of FIG. 12 to the position of FIG. 11 or from the position of FIG. 11 back to the position of FIG. 10 necessitates an axial as well as an angular displacement of the sleeve. Moreover, and in order to carry out the necessary axial movement, the sleeve 104 must overcome the resistance of the spring 28. It has been found that the aforedescribed cooperation between the cam 34 and the follower 33 is amply sufficient to ensure reliable retention of the sleeve 104 in the selected position (of FIGS. 10, 11 or 12) even though the coupling of FIGS. 10–12 does not employ clamps of the type described in connection with FIGS. 1 to 8. The absence of a clamp 5 renders it possible to strengthen the sleeve 104 because the latter need not be provided with slots corresponding to the slots 22, 23 of the sleeve 4.

The cam 34 constitutes a groove in the peripheral surface 201a of the coupling member 201.

The provision of two cams 34 and two followers 33 is desirable and advantageous on the ground that the sleeve 104 is much less likely to jam during movement in or counter to the direction indicated by the arrow I of FIG. 10.

The followers 33 need not be of one piece with the retainer 30 of the sleeve 104. However, the construction which is shown in FIG. 13 is preferred at this time because it simplifies the making of the sleeve 104 and also because the retainer 30 enhances the sturdiness of the followers 33.

The improved coupling is susceptible of numerous additional modifications without departing from the spirit of the invention. For example, a hose or another conduit which is sealingly connected to connectable with the terminal 7 of the coupling member 1, 101 or 201 can be sealingly secured to the end 11 of the conduit 10; the external thread 8 of the terminal 7 is then designed to be moved into mesh with the internal thread of a fixedly mounted pipe, tube or an analogous conduit which is to receive a fluid through, or which is to deliver a fluid into, the member 1, 101 or 201 of the improved coupling. Furthermore, the coupling can be used to establish a path for the flow of fluid between two rigid conduits or between two hoses or other flexible conduits. The end 11 of the conduit 10 can be connected with one end of a hose, the terminal 7 can be threaded into a rigid pipe, and the coupling then establishes a separable connection between the rigid pipe and the hose. Still further, the features of the illustrated couplings can be interchanged or combined. For example, the coupling of FIGS. 1-2, the coupling of FIGS. 4 and 6-7 or the coupling of FIG. 8 can be provided with means for releasably holding the sleeve 1 or 101 in a third position which the sleeve reaches by moving beyond the locking position in a direction away from the release position.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A device for separably connecting an end of a first conduit with a second conduit having an end with a substantially radially extending retaining portion, comprising an elongated tubular coupling member having a first terminal connectable with the end of the first conduit, a second terminal engageable with the end of the second conduit, and arms movable substantially radially of said coupling member into and from engagement with the retaining portion of the second conduit upon engagement of said second terminal with the end of the second conduit; a sleeve surrounding and movable longitudinally of said coupling member between first and second positions in which said arms are respectively held against disengagement and are free to become disengaged from the retaining portion at the end of the second conduit; and means independent of said sleeve for releasably locking said sleeve in said second position, including a resilient clamp releasably attached to said coupling member and having legs movable relative to each other between inoperative positions of disengagement from said coupling member in which said sleeve is free to move from said second to said first position and operative positions of engagement with said coupling member to thus lock said sleeve in said second position.

2. The device of claim 1, wherein the retaining portion extends substantially radially outwardly of the end of the second conduit and said arms are resilient and are movable radially outwardly and thereupon radially inwardly toward engagement with the retaining portion and radially outwardly for disengagement from the retaining portion, said sleeve including a portion which prevents radially outward movements of said arms in the first position of said sleeve and said legs being resilient and tending to engage said coupling member.

3. The device of claim 1, wherein said clamp is resilient and said legs are movable away from each other to said inoperative positions and toward each other to said operative positions thereof.

4. The device of claim 1, wherein said coupling member has a peripheral surface with a recess for reception of at least one of said legs in the second position of said sleeve.

5. The device of claim 4, wherein said peripheral surface has an undercut portion bounding a portion of said recess to prevent unintentional withdrawal or expulsion of said at least one leg from said recess.

6. The device of claim 4, wherein said peripheral surface has a second recess for reception of at least one of said legs in the first position of said sleeve.

7. The device of claim 6, wherein said peripheral surface has a portion bounding at least a portion of said second recess and being configurated to prevent expulsion of the at least one leg from the second recess prior to the application to said sleeve of a predetermined force acting in a direction to move the sleeve from the first position toward the second position.

8. The device of claim 7, wherein said second recess is disposed between said arms and said recess for reception of at least one leg in the second position of said sleeve.

9. The device of claim 6, wherein at least one of said recesses is a circumferentially complete groove in said peripheral surface.

10. The device of claim 4, wherein said peripheral surface includes an undercut portion bounding a portion of said recess and being configurated to prevent a movement of said legs to said inoperative positions prior to the application to said sleeve of a predetermined force acting in a direction to move said sleeve from said second position.

11. The device of claim 1, wherein said coupling member has a peripheral surface with a recess for reception of at least one of said legs in the first position of said sleeve, said peripheral surface including a portion bounding at least a portion of said recess and being configurated to prevent expulsion of said at least one leg from said recess prior to the application to said sleeve of a predetermined force acting in a direction to move the sleeve from the first position toward the second position.

12. The device of claim 1, wherein said sleeve has first and second slots for portions of said legs, said slots being disposed substantially diametrically opposite each other and extending substantially circumferentially of said sleeve, said legs having free ends extending from said sleeve through one of said slots and at least said one slot having a length sufficient to permit movements of said free ends relative to each other to move said legs to said inoperative positions of disengagement from said coupling member.

13. The device of claim 12, wherein said free ends of said legs extend substantially tangentially of said sleeve and at least partially overlie each other.

14. The device of claim 1, wherein said sleeve has a slot for portions of said legs, said legs having free ends extending from said sleeve through said slot and said slot being dimensioned to permit movements of said free ends relative to each other so as to move said legs to said inoperative positions of disengagement from said coupling member.

15. The device of claim 1, wherein said coupling member has a peripheral surface with a shoulder for at least one of said legs, and further comprising means for biasing said sleeve toward said first position.

16. The device of claim 15, wherein said biasing means comprises a spring reacting against said coupling member and bearing against said sleeve to urge said sleeve against said clamp.

17. The device of claim 16, wherein said clamp is movable into and from engagement with said coupling member substantially radially of said sleeve.

18. The device of claim 1, further comprising sealing means insertable between said second terminal and the second conduit.

* * * * *